Sept. 8, 1931.   W. H. DAVID   1,822,017
AUTOMOBILE AND AEROPLANE SIGNAL
Filed Jan. 12, 1929   2 Sheets-Sheet 1
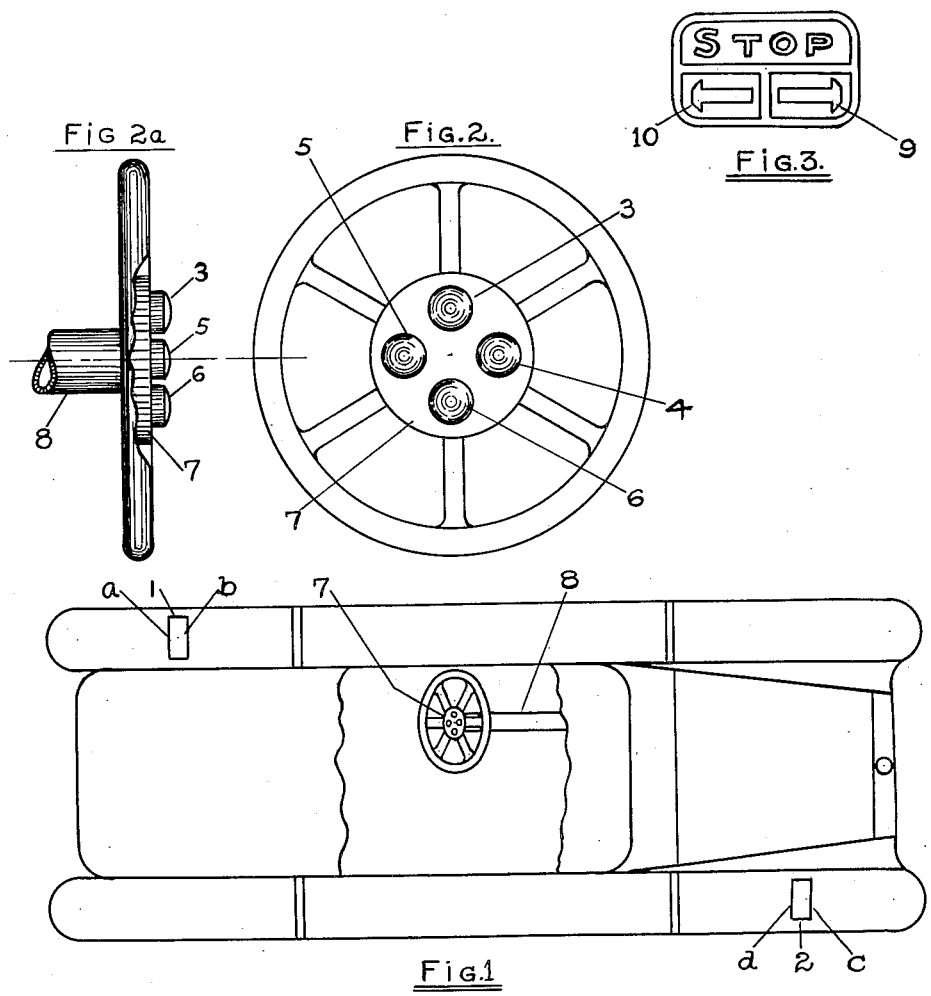

Sept. 8, 1931.       W. H. DAVID       1,822,017
AUTOMOBILE AND AEROPLANE SIGNAL
Filed Jan. 12, 1929      2 Sheets-Sheet 2

WITNESSES
Nicholas F. Wodgey
Herbert Lunt Jr.

INVENTOR
William H. David
ATTORNEY

Patented Sept. 8, 1931

1,822,017

UNITED STATES PATENT OFFICE

WILLIAM H. DAVID, OF TOTTENVILLE, NEW YORK

AUTOMOBILE AND AEROPLANE SIGNAL

Application filed January 12, 1929. Serial No. 332,153.

My invention is an improvement in direction signals for vehicles equipped with a battery or generator. Its aim is to give a positive notice of direction or stop, and preferably to also sound a horn by a simultaneous operation by the driver of a car or the pilot of an aeroplane. If the vehicle, which may for instance be an automobile or an aeroplane, is to be turned to the right, the signal points to the right. If it is to be turned to the left, the signal points to the left. Preferably the signal is given on the left hand side at the rear, and preferably such signal is given at that point in a rearwardly direction, so that the driver of an oncoming car can see it; and preferably the rear signal also appears facing in the forwardly direction, so that the driver approaching on a side street on the left hand side, and from the front, will also see it.

The signal at the front of the car, as above referred to, is preferably given on the right hand side. Thus the front signal will appear in such a way that a car approaching on a side street from the right hand side will see it. The signal is also given from the rear of the last mentioned point, that is to say, facing the driver, so that he also will know that the signal is operating properly.

If the operator presses one button, the selected one, according to circumstances, the signal will appear but the horn will not sound. If he presses the button to give the desired direction, or stopping signal, and also simultaneously with another finger depresses another button to sound the horn, then the desired signal will appear and notice will also be given by the sounding of the horn, which is the preferred and complete and best method of giving the signal.

In the drawings, which form part of the specification, I have fully and sufficiently illustrated my invention.

Fig. 1 is a simple plan view of an automobile construction, sufficient to illustrate generally the application of my improvements to automobiles, pleasure, business vehicles, trucks, etc., etc.

Fig. 2 is an enlarged view in a horizontal plane of a steering wheel, as the driver sees it when operating the car.

Figure 4:
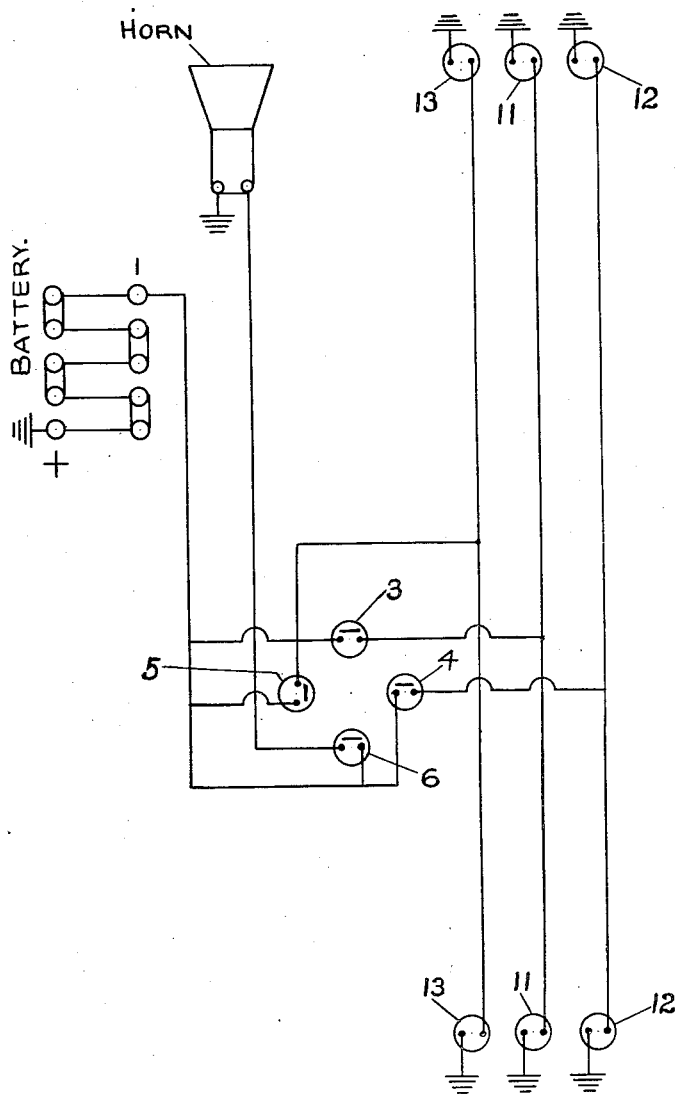

This view shows the upper surface of the steering wheel. It also shows the top or head of the steering wheel column and the tops of the signal push buttons mounted in said head.

Fig. 2a is a correspondingly enlarged edge view of the steering wheel. The wheel is here shown in a vertical plane, mounted for rotation on the upper end of the steering wheel column. The signal push buttons are shown mounted in the head of said column and will be readily recognized as push buttons.

Fig. 3 is an enlarged view of one design of my signal devices and improvements.

Fig. 4 is a wiring diagram.

The rear signal (1), is an electrically operated automobile signal. It faces to the rear as indicated by reference character $a$, and shows a signal light. Such a signal is indicated in Fig. 3. It may be either the stop signal or the right-hand turn signals, as indicated by the arrow pointing to the right; or it may be the left hand turn signal, as indicated by the arrow pointing to the left. It is a two-way signal, that is to say, the same signal will appear simultaneously on the front face as well as the rear face of the rear signal. The front face is indicated by reference character $b$.

The front signal, 2, signals exactly the same as the rear signal, 1, and has front light, indicated by $c$, and rear light indicated by small $d$. Thus, if the left hand signal indicated by the arrow pointing to the left, appears on the rear face of the signal at the rear, exactly the same arrow will appear on the front face of that signal and also on the front and rear faces of the front signal. Likewise as to the right hand signal, or the stop signal. In all cases the signal given appears simultaneously on all four faces.

There are four buttons, 3, 4, 5 and 6, on the non-turning head, 7, at the top of the steering wheel column 8. They may be arranged in any desired order. As shown in the drawings herein, 3 is the stop signal button; 4 is the right hand turn signal button;

5 is the left hand turn signal button, and 6 is the button for sounding the horn. The depression of any one of these buttons closes the circuit to show the selected signal or to sound the horn, or preferably both simultaneously.

Thus, referring to Fig. 3, if the driver is going to stop, he presses the button 3 with one finger and simultaneously with another finger presses button 6. The light marked "Stop" appears on the front and rear of each signal. In case he is to turn to the right, he presses buttons 4 and 6. The arrow, 9, pointing towards the right lights on all the signals and the horn sounds; or if he is turning to the left he presses buttons 5 and 6, and arrow 10, pointing toward the left, lights and the horn sounds.

The battery is indicated by the word "Battery". It is connected from its negative pole by suitable wiring directly to each of the buttons, 3, 4, 5 and 6. The button 3 is wired to the stop lights, 11, at the rear signal 1 and front signal 2. Button 4 is wired to the lights, 12, indicating right hand turn. Button 5 is wired to the left hand turn lights, 13. Button 6 is wired to the horn indicated by the word "Horn". The battery signal lights and horn are grounded in the usual manner.

I wish it understood that while I have shown my preferred arrangement and mode of operation herein, I do not intend to so limit myself. I believe that my method of signalling, described and shown, is broadly new, and intend to so claim it herein.

Signals heretofore in use are not sufficiently definite in view of the enormous growth of automobiling and the consequent congestion. My invention is thus a safety device. It is an absolutely safe notification to all those following and also to those approaching from the front, both vehicles of all kinds and also pedestrians. Thus when any deviation is to be made by the driver from the forward travel of the car or any slowing down or stopping, either in the daytime or in the night, he will clearly and unmistakably, by the signal lights, notify all those who in any way require a signal. The sounding of the horn will also attract their attention, so that they will thereby be put on full notice, by sight and by sound to look out for the approach of danger.

My herein invention comprises a combination of one or more light signals, battery to light the signals, a horn, motor means for sounding the horn, electric circuits and push buttons to close the circuits to light the signals and sound the horn, the push buttons being mounted in the non-turning head of the steering wheel column.

In the drawings I show one style of light signal, which I style a two-way signal, and particular locations for the signals. However, I wish it to be clearly understood that, except where specifically so stated in the claims, I do not intend to limit my claims to the particular light signals shown or the particular locations shown therefor, since it is obvious that the combinations stated in the claims may be employed with other light signals and otherwise located.

Having thus described my invention, and without limiting myself to the precise details shown, what I claim as new and desire to secure by Letters Patent, is:

1. In a vehicle, the combination with two independent electric circuits, of a steering wheel and its column, a light signal, a battery to light the signal, a horn, motor means for sounding the horn, a push button on the head of said column adapted to close one of said circuits to light the signal and a second push button on said head adapted to be simultaneously operated by the same hand to close the other circuit to sound the horn.

2. In a motor vehicle, the combination of a steering wheel and its column, a series of light signals, a battery to light the signals, a series of electric circuits to selectively light a signal in the series, a horn, motor means for sounding the horn, a series of push buttons on the head of said column respectively adapted to independently close any one of said light circuits, and another push button on said head adapted to independently and simultaneously and by the same hand close an electric circuit to sound the horn.

3. In a motor driven vehicle, the combination of a steering wheel and its column, four independent push buttons on the head of said column, three of said buttons being adapted respectively to light a stop signal, a signal to turn right and a signal to turn left, and the fourth being adapted to simultaneously and by the same hand sound the horn.

WILLIAM H. DAVID.